United States Patent [19]
Ford et al.

[11] Patent Number: 5,026,254
[45] Date of Patent: Jun. 25, 1991

[54] CALIBRATED PITCH CHANGE LINK

[75] Inventors: Russell W. Ford, McDonough, Ga.; David S. Shepherd, Wallingford, Pa.

[73] Assignee: Bell Helicopter Textron Inc., Fort Worth, Tex.

[21] Appl. No.: 421,020

[22] Filed: Oct. 13, 1989

[51] Int. Cl.$^5$ .......................................... B64C 27/54
[52] U.S. Cl. .................. 416/61; 416/168 R; 74/586; 116/281
[58] Field of Search .............. 416/61, 168, 147, 153; 74/586; 116/252, 281, 282, 299, DIG. 21; 33/813

[56] References Cited

U.S. PATENT DOCUMENTS

| | | | |
|---|---|---|---|
| 2,759,359 | 8/1956 | Jensen et al. | 416/168 X |
| 3,008,525 | 11/1961 | Jensen | 416/61 |
| 3,415,324 | 12/1968 | Austin, Jr. | 416/61 |
| 3,736,010 | 5/1973 | Larkin | 416/61 X |
| 4,498,842 | 2/1985 | Fischer et al. | 416/61 X |

FOREIGN PATENT DOCUMENTS 2811678  9/1979  Fed. Rep. of Germany ........ 416/61

Primary Examiner—Edward K. Look
Assistant Examiner—James A. Larson
Attorney, Agent, or Firm—Ross, Howison, Clapp & Korn

[57] ABSTRACT

A calibration device for a pitch change link (10) for a helicopter rotor grip where the link (10) includes a bearing (12) and includes a plurality of sequential reference numbers (22) equally spaced apart and concentrically disposed around the link (10). An indexing device (30) is mounted to the bearing (12) and is disposed adjacent to the plurality of sequential reference numbers (22) for locating one of the plurality of reference numbers (22) representing the length of the link (10). The indexing device (30) includes a window (40) which indexes one of the plurality of reference numbers (22) as the link (10) rotates.

3 Claims, 1 Drawing Sheet

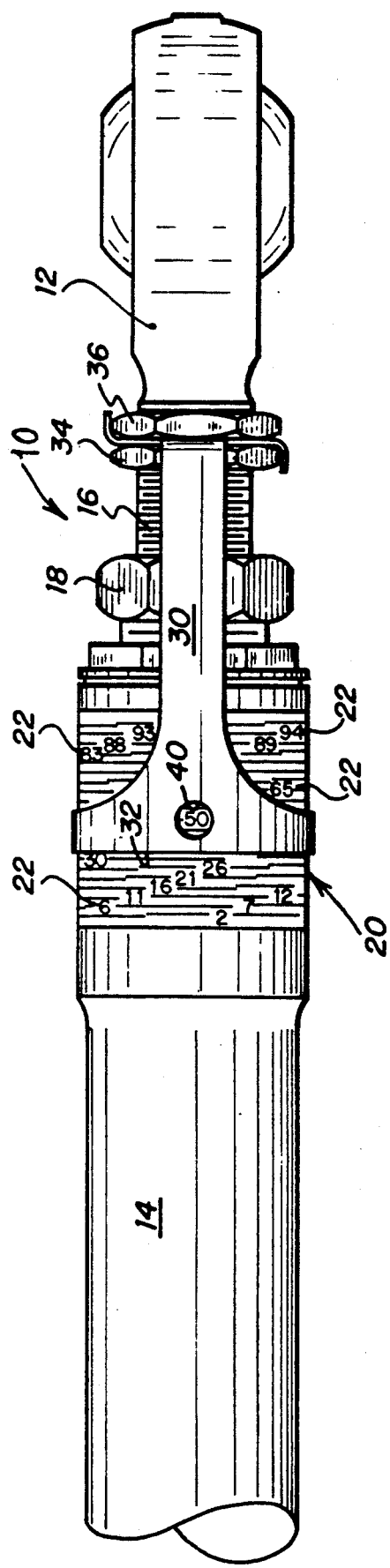
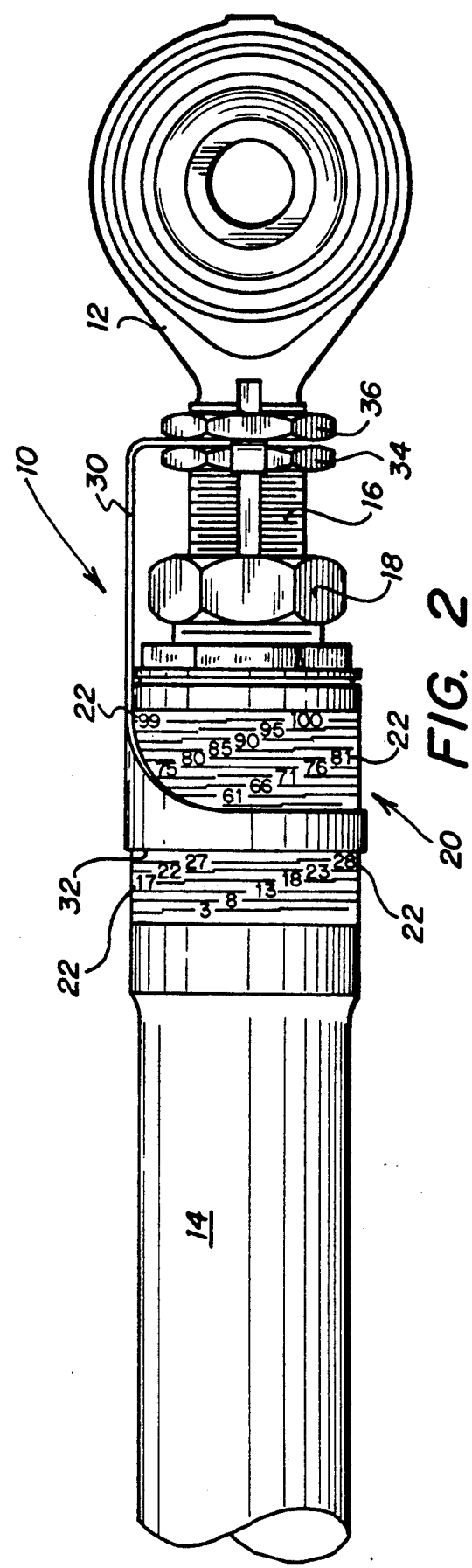

CALIBRATED PITCH CHANGE LINK

This invention was made with Government support under N00019-85-C-0145 awarded by Department of the Navy, Naval Air Systems Command. The Government has certain rights in this invention.

TECHNICAL FIELD OF THE INVENTION

The present invention relates to calibration devices, and more particularly, to a device for calibrating a pitch change link of a helicopter rotor grip assembly.

BACKGROUND OF THE INVENTION

In a helicopter rotor grip assembly, pitch change linkages are utilized for interconnecting the rotor grip and a control system for the rotor blades. The pitch change link length is manually adjustable in order to track the rotor properly so that all three blades of the helicopter turn in the same tip path plane. Each blade is adjustable independently of the other two blades to increase or decrease the blade pitch. For rotor blade tracking and balance, the pitch change links are adjusted to increase or decrease the length of the link thereby changing the pitch of the rotor blade.

Typically in the adjustment process, the maintenance personnel will mentally note, or a make a written record of the adjustment made to a pitch change link. Subsequently, when additional changes must be made to the blade pitch, the maintenance personnel may not recall whether a previous change was an increase or a decrease in the pitch change link length, and therefore inaccuracies and more frequent adjustments of the pitch change link are required in order to properly adjust the pitch of the rotor blades. Current techniques for changing the length of the pitch change link provide no reliable and accurate scheme for determining or recording changes as adjustments of the pitch change link are made during rotor blade tracking and balance. The maintenance personnel may arbitrarily rotate the pitch change link by a portion of a turn, but not be able to duplicate this same change for subsequent link adjustment. Further, it is undesirable to remove a pitch change link from the helicopter rotor assembly after each adjustment for measuring the length of the pitch change link. Such a procedure is time consuming, and further results in inaccuracies during the rotor blade tracking and balance procedure.

A need has thus arisen for a pitch change link that allows for a direct and accurate reading of changes in length for use during rotor blade tracking and balancing without removal of the pitch change link from the helicopter hub assembly. A need has further arisen for a calibration device for a pitch change link that automatically displays reference indicia to indicate a corresponding length of the pitch change link.

SUMMARY OF THE INVENTION

In accordance with the present invention, in a pitch change link for a helicopter rotor grip which includes a bearing, a calibration device is provided. The calibration device provides a visual indication of the length of the link. The device includes a plurality of position indicia disposed and spaced apart on the link. An indexing device is mounted to the bearing for locating one of the plurality of position indicia.

In accordance with another aspect of the present invention, a calibration device for a pitch change link for a helicopter rotor grip where the link includes a bearing is provided. The calibration device includes a plurality of sequential reference numbers equally spaced apart and concentrically disposed around the link. An indexing device is mounted to the bearing and disposed adjacent to the plurality of sequential reference numbers for locating one of the plurality of reference numbers representing the length of the link. The indexing device includes a window indexing one of the plurality of reference numbers as the link rotates.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 1 is a top plan view of the present pitch change link calibration device; and FIG. 2 is a side view of the present pitch change link calibration device illustrated in FIG. 1.

DESCRIPTION OF THE PREFERRED EMBODIMENTS

Referring simultaneously to FIGS. 1 and 2, a portion of a pitch change link assembly is illustrated, and is generally identified by the numeral 10. As is well known to those skilled in the art, pitch change link assembly 10 is mounted between a pitch horn of a rotor grip and a rotor control system for adjusting the pitch of helicopter blades. The pitch change link assembly 10 is interconnected to the pitch horn (not shown) by a bearing 12 and through a bearing (not shown) at the opposite end of pitch change link assembly 10 to the control system.

Pitch change link assembly 10 includes a pitch link tube 14. Bearing 12 includes a threaded rod which engages tube 14. Tube 14 is disposed between a pair of jam nuts 18, with only one jam nut 18 illustrated in the Figures. The length of pitch change link assembly 10 is adjusted by rotating pitch link tube 14. Jam nuts 18 are loosened on each end of pitch change link assembly 10 so that the bearing 12, and more specifically rod 16, will move inwardly or outwardly of tube 14 to increase or decrease, respectively, the overall length of pitch change link assembly 10. When the desired adjustment is made, jam nuts 18 are retightened to fix the length of pitch change link assembly 10.

In accordance with the present invention, a plurality of reference indicia, generally identified by the numeral 20 are disposed circumferentially around an end of pitch link tube 14. Reference indicia 20 may include, for example, individual reference numbers 22, which are equally spaced along the end of pitch link tube 14. Reference numbers 22 may extend between "0" at the innermost end of pitch link tube 14 to "100" at the outermost end of pitch link tube 14. Reference numbers 22 each represent a predetermined length of pitch change link assembly 10.

In order to index a desired length of pitch change link assembly 10, by selecting a particular reference number 22, a calibration collar 30 is mounted to rod 16 of bearing 12. Calibration collar 30 includes an end surface 32. Calibration collar 30 is mounted to bearing 12 utilizing jam nuts 34 and 36. As bearings 12 move toward or away from each other at the ends of pitch link tube 14, calibration collar 30 moves in the same relative direction. For example, when bearings 12 move toward each other, calibration collar 30 moves from the outermost end of pitch link tube 14 toward the center of pitch link tube 14. Correspondingly, when bearings 12 move outwardly in order to increase the length of pitch change link assembly 10, calibration collar 30 moves from the center of pitch link tube 14 toward the outermost end of pitch link tube 14. Therefore, by aligning the end surface 32 of calibration collar 30 with one of the reference numbers 22, a direct reference length of pitch change link assembly 10 can be automatically identified. Subsequent changes in the length of pitch change link assembly 10 can be effectuated through rotation of pitch link tube 14 by increasing or decreasing the position of calibration collar 30 by a predetermined number of reference numbers 22. Rotation of pitch link tube 14 causes each reference number 22 to appear adjacent end surface 32 of calibration collar 30, which can be referenced at the center of calibration collar 30. Additionally, to assist in the reading of the reference numbers 22, calibration collar 30 may include a window 40 for specifically viewing and accurately locating a reference number 22 representing a desired length of pitch change link assembly 10.

Through the use of the present invention, maintenance personnel can thereby adjust the length of pitch change link assembly 10 by rotating pitch link tube 14 to a desired reference number 22, either increasing the reference number 22 or decreasing the reference number 22 to thereby increase or decrease, respectively, the length of pitch change link assembly 10. For example, if the previous reading within window 40 was "50", as shown in FIG. 1, and it was desired to lengthen the overall length of pitch change link assembly 10, pitch link tube 14 would be rotated until a higher number, for example, such as "60" were viewed within window 40. Similarly, if it was desired to shorten the overall length of pitch change link assembly 10, pitch change link assembly tube 14 would be rotated in the opposite direction until a lower number such as, for example, "45" were shown through window 40 of calibration collar 30. The prior position of pitch change link assembly 10 will always be visible to maintenance personnel through window 40 or by viewing the end surface 32 of calibration collar 30, and there would be no need for mentally remembering or for consulting a written record of the prior setting of pitch change link assembly 10. Further, since reference indicia 20 are permanently located on pitch link tube 14, accurate and repeatable changes in the length of pitch change link assembly 10 can be performed by noting the desired reference number 22 required.

It therefore can be seen that the present calibration device allows for the direct reading of changes of length of a pitch change link assembly for a helicopter rotor grip for adjusting rotor blade tracking and balance without removal of the pitch change link assembly from the helicopter hub. The present calibration device eliminates the need for recording link changes during blade pitch adjustments and results in a more accurate and reliable system for adjusting the length of a pitch change link assembly.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A calibration device for a pitch change link for a helicopter rotor grip, the link including a bearing, comprising:
   a plurality of position indicia concentrically disposed and spaced apart around the link and including sequential reference numbers equally spaced along the link representing the length of the link; and
   means for indexing mounted to the bearing and disposed adjacent to the link for locating one of said plurality of positioned indicia.

2. The calibration device of claim 1 wherein said indexing means includes:
   sight means for aligning and identifying one of said plurality of said position indicia.

3. A calibration device for a pitch change link for a helicopter rotor grip, the link including a bearing, comprising:
   a plurality of sequential reference numbers equally spaced apart and concentrically spaced around the link; and
   a window for viewing said plurality of sequential reference numbers mounted to the bearing and disposed adjacent to said plurality of sequential reference numbers for locating one of said plurality of sequential reference numbers representing the length of the link.

* * * * *